Dec. 30, 1930.  E. A. JOHNSTON ET AL  1,786,851
COTTON PICKER
Filed Sept. 4, 1928  3 Sheets-Sheet 1

Inventor:
Edward A. Johnston,
Bert R. Benjamin,
David B. Baker and
Clarence R. Hagen.
By H. P. Doolittle
Atty.

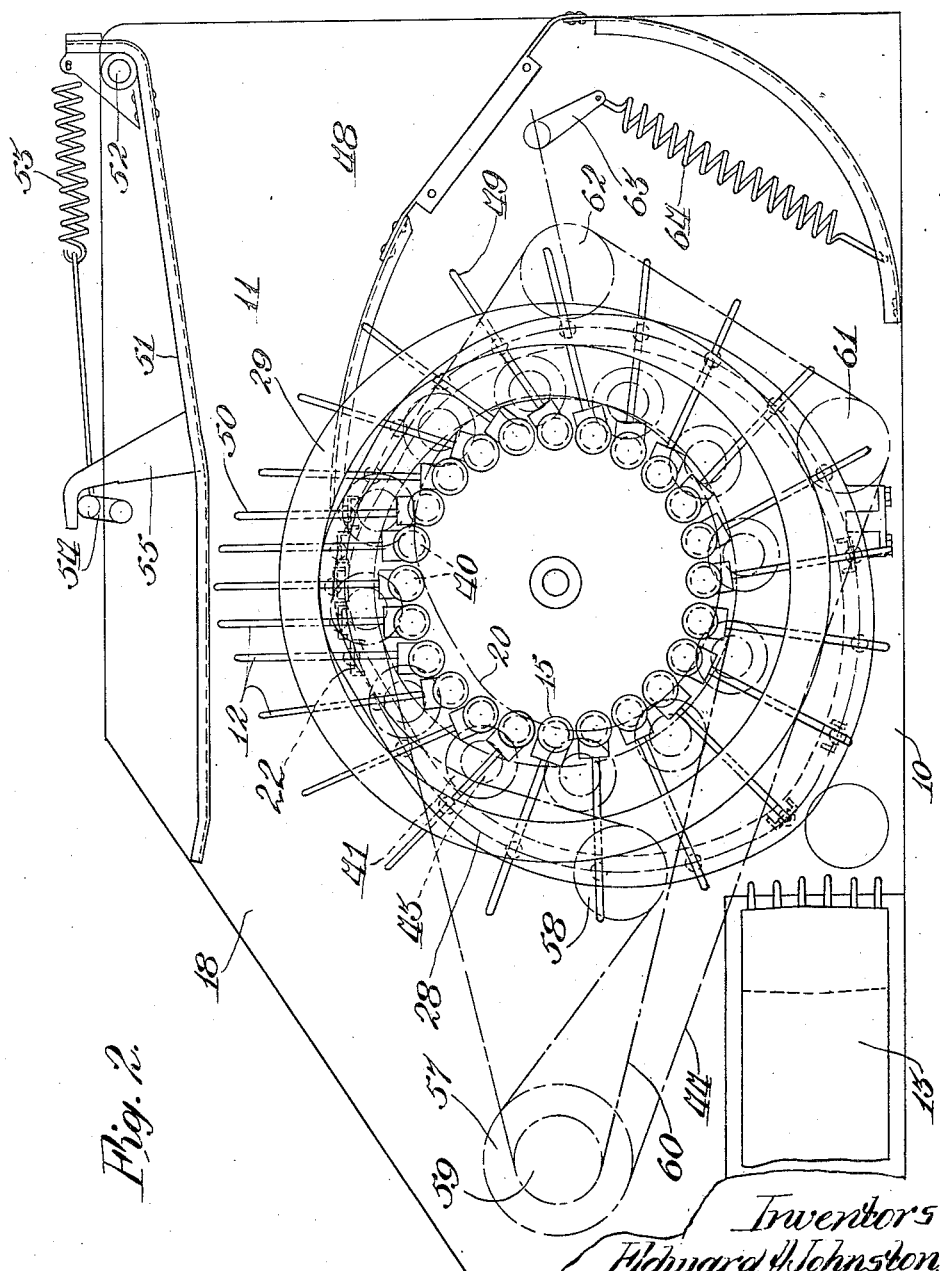

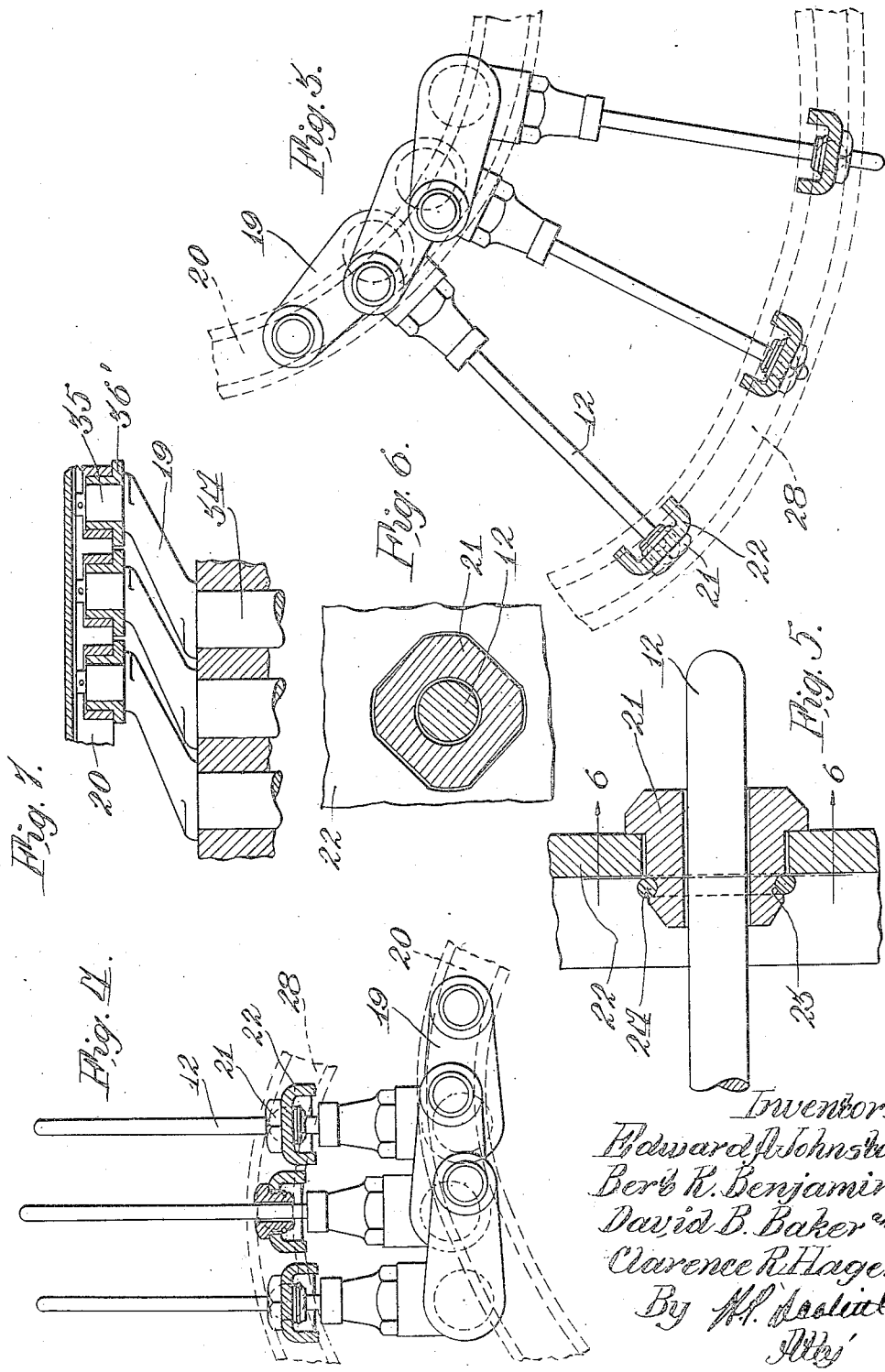

Patented Dec. 30, 1930

1,786,851

UNITED STATES PATENT OFFICE

EDWARD A. JOHNSTON, OF CHICAGO, BERT R. BENJAMIN, OF OAK PARK, AND DAVID B. BAKER AND CLARENCE R. HAGEN, OF CHICAGO, ILLINOIS, ASSIGNORS TO INTERNATIONAL HARVESTER COMPANY, A CORPORATION OF NEW JERSEY

COTTON PICKER

Application filed September 4, 1928. Serial No. 303,646.

This invention relates to cotton pickers of the rotary picker stem type.

An object of the invention is to provide an advantageous and novel form of doffer for such cotton pickers.

A more specific object of the invention is to provide a sleeve type doffer having a closely fitting sleeve provided upon each picker stem so as to be capable of movement to the tips of the stems to force collected cotton therefrom. This doffer mechanism is combined with a cotton picker otherwise of the kind known as the "Price-Campbell" type, in which the picker bars are angled relative to a carrier as they are moved in an endless path by the carrier.

Other objects of the invention will appear as the accompanying description proceeds.

An illustrative embodiment of the invention is shown in the accompanying drawings, in which:

Figure 2 is a schematic view somewhat in the nature of a plan, illustrating generally the action of the various parts of the machine;

Figure 3 is a detail view illustrating the conditions of the parts when the doffers are substantially at the tips of the picker stems, having been forced outwardly of the stems to strip all cotton therefrom;

Figure 4 is a detail view showing the picker stems in their relative positions wherein they are projected into the cotton plants, the doffers being retracted toward the bases of the picker stems.

Figure 5 is a detail view largely in vertical section, showing the relation of each individual stripping sleeve or doffer to a picker stem and the stripper bar carrying a group of the sleeves;

Figure 6 is a detail vertical sectional view taken substantially on the line 6—6 of Figure 5 and illustrating the "fit" by which each stripping sleeve is related to the stripper bar; and Figure 7 is a detail view illustrating the arrangement of crank arms at the top of the machine for angling the picker stem supports as they are moved in an endless path by a carrier.

Figure 1:
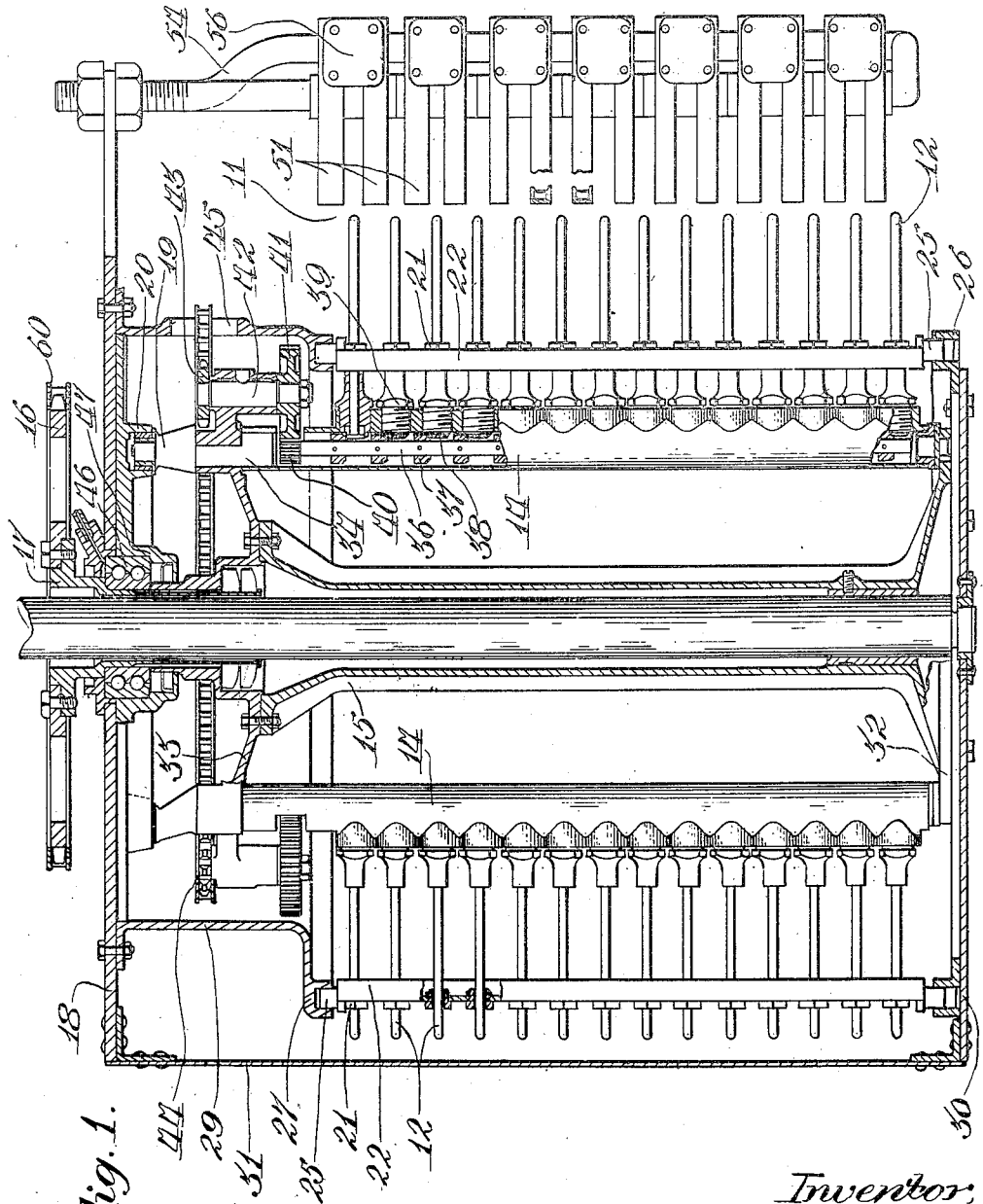
Figure 1 is substantially a vertical sectional view through the illustrative machine.

In Figure 2 of the drawings a machine body 10 having a plant passage 11 is indicated. Picker stems 12 are projected into the plant passage as the machine is drawn along. They are rotated while in the passage and are then withdrawn from the passage so that the wound-up cotton may be stripped or doffed and delivered to a conveyor 13 for moving the cotton to a point of collection.

The picker stems of the illustrative machine are carried in groups by supports 14 herein shown as upright gear casings arranged in circular formation on a rotatable carrier 15. This carrier is rotated by a sprocket wheel 16 connected with the carrier through a sleeve construction 17 passing through the top 18 of the machine body.

As the picker stems and their supports are carried from positions near the plant passage to positions remote therefrom, the supports are angled by the action of crank arms 19, the upper ends of which are guided in a cam track 20. This angling of the picker stems and their supports designedly causes a maximum number of picker stems to be presented within the plants when the cotton lint is being wound up, and it also causes the picker stems to be presented in a proper position for the doffing of the cotton therefrom.

Each picker stem is continuously surrounded by the doffer herein shown as a sleeve 21. All of the sleeves for the picker stems of one support are carried by a stripper bar 22 which, as illustrated in Figure 1 of the drawings, is movable from a position close to its associated picker stem support 14 to a position near or at the tips of the picker stems to cause the sleeves to strip the cotton therefrom. In Figure 1 the picker stems are shown projected into the plant passage at the right hand part of the figure. At this position a stripper bar 22 with its sleeves 21 is close to a picker stem support 14, while on the opposite side of the machine an opposite picker stem support has its stripper bar moved to a position near the ends of the picker stems. In the drawings the picker stem is shown as having a picking portion of substantially uniform diameter throughout its length. This facilitates continuously effective stripping of the cotton by reason of the fact that the stripping action of a sleeve 21 is not diminished as it approaches the tip of the picker stem, as would be the case in a picker stem having a substantial taper. The sleeve 21 is closely fitted to the picker stem 12, but is rather loosely and removably fitted within its stripper bar 22, as indicated in Figures 5 and 6 of the drawings. Also, by means of the polygonal contour of the sleeve 21, it is prevented from rotation with respect to the stripper bar. Each sleeve 21 is provided with a circular groove 23 for receiving a detachable annulus 24 adapted to engage the inner wall of the stripper bar 22 to maintain the sleeve in its operative position in the stripper bar.

At the upper and lower ends of each stripper bar there is a circular stud 25 projecting at the base of the machine into a doffer cam track 26, and at the top of the machine into a similarly shaped track 27. In Figure 2 of the drawings, the center line 28 indicates the position and shape of each of these cam tracks. The upper cam track 27 is formed as part of a housing 29 secured to the top 18 of the machine.

The lower cam track 26 is secured to the base plate 30 held in position relative to the top of the machine by side walls 31.

Each picker stem support 14 is of hollow, cylindrical construction journaled at its lower end in a journal plate 32 rigid with the carrier 15. At its upper end it is journaled in a head 33 of the carrier. Movable and rigid with the upper end of each support is a shaft extension 34 journaled in the head 33 and rigidly carrying a crank arm 19. Each crank arm is formed at its upper end as a circular stud 35 surrounded by a bushing 36' which rides within and is guided by the cam track 20.

Within each support 14 is a vertical shaft 36 having guided thereon a number of superposed bevel gears 37. Each bevel gear meshes with another bevel gear 38 of similar construction and carried by a picker stem 12. Each gear 38 is journaled with its picker stem within a removable housing 39 herein shown as screw threaded into the support 14. At the top, each shaft 36 carries a spur pinion 40 meshing with a gear 41 fixed on a counter-shaft 42 journaled within the head 33. At the upper end of each counter-shaft 42 is a driving sprocket 43. These driving sprockets are in circular formation and are operated by a sprocket chain 44 entering the housing 29, as indicated at 45 in Figure 1 of the drawings.

The entire picking mechanism is supported from the top of the machine body by a roller bearing 46 supported within a socket piece 47 and enclosing the sleeve construction 17 by which power is transmitted from the sprocket wheel 16 to the carrier 15.

The machine proceeds in the direction of the arrow 48 in Figure 2 of the drawings. As it proceeds the picker stems, proceeding from the positions 49 to the positions 50, are projected into the cotton plants within the plant passage 11. In order that the plants may be held in such positions that the picker stems will come into effective engagement therewith the wall of the passage 11 remote from the picking apparatus is shown as spring pressed toward the picker stems and their supports. As illustrated, this wall comprises a number of superposed channel bars 51 pivoted at their forward ends upon an upright post 52. Each bar 51 extends from the picking mechanism to the post 52 and is then extended outwardly so as to form in effect a bell crank lever, to the outer end of which is secured a retractile spring 53 anchored at its other end to a stop 54 against which a movable stop 55 carried by the bar 51 is engaged. The stop 54 is a fixed stop carried by the machine body. Preferably, the bars 51 are united in pairs at their forward ends by tie plates 56.

The driving chain 44 for the picker stems passes around a driving sprocket 57 and an idler 58, which may be adjustable to regulate the time at which the picker stems begin their winding up action. Herein shown as coaxial with the driving sprocket 57 is another sprocket 59 operating a belt or chain 60 which is trained around a sprocket wheel 16. Additional idlers 61 and 62 are provided for the belt or chain 44. The idler 62 may be caused to act as a chain tightener by reason of having a resilient mounting herein indicated by the crank arm 63 connected with the spring 64.

It will be evident from the description given that the successive ranks of spindles will be positively swung on the vertical axes of the supports 14 as the carrier revolves and that the stripper bars 22 are so mounted as to permit this angular movement of the spindles while traveling from base to tip thereof.

Although the invention has been described with particular reference to one machine, it is to be understood that it is not limited thereto, but is of a scope commensurate with the scope of the appended claims.

What is claimed as new is:

1. A cotton picker comprising, in combination, rotatable picker stems, a body affording a plant passage, upright supports carrying the picker stems in separate groups, a carrier for the supports, means for revolving the carrier, means for angling the supports and the picker stems relative to the carrier during movements of the picker stems into and out of the plant passage, doffer sleeves continuously surrounding the individual picker stems and slidable with respect thereto, vertical bars connecting the sleeves in groups, and means for moving the bars relative to each other to successively slide the sleeves from the bases of the picker stems to their tips and back again to the bases.

2. A cotton picker comprising, in combination, rotatable picker stems, a body affording a plant passage, upright supports carrying the picker stems in separate groups, a revoluble carrier for the supports on which said supports are pivotally mounted, means for angling the supports and the picker stems relative to the carrier during movements of the picker stems into and out of the plant passage, a movably mounted stripper bar for each group of picker stems, a doffer sleeve surrounding each picker stem and closely fitting the picker stem, means for retaining the sleeves of each separate group of picker stems in a stripper bar, and means for successively moving the stripper bars of each group from the bases of the picker stems to their tips and back to the bases.

3. A cotton picker comprising, in combination, rotatable picker stems, a body affording a plant passage, upright supports carrying the picker stems in separate groups, a carrier for the supports, means for angling the supports and the picker stems relative to the carrier during movements of the picker stems into and out of the plant passage, a doffer sleeve permanently surrounding each picker stem and slidable with respect thereto, a stripper bar for each group of picker stems, means for mounting all of the sleeves for one group of picker stems in a picker bar, and means for successively moving the stripper bars toward the tips of the picker stems and then backwardly to the bases of the picker stems.

4. A cotton picker comprising, in combination, a revolubly mounted carrier, upright supports pivotally mounted around the periphery of said carrier, rotatable picker stems extending from each support, means for rotating the carrier and simultaneously rocking the supports, circular guide tracks adjacent the upper and lower ends of the carrier and eccentric to the axis thereof, and a stripper bar opposite each support having its ends mounted for movement in the guide tracks and slidably engaging the spindles on said support.

In testimony whereof, we affix our signatures.

EDWARD A. JOHNSTON.
BERT R. BENJAMIN.
DAVID B. BAKER.
CLARENCE R. HAGEN.